(12) United States Patent
Ben-Shalom et al.

(10) Patent No.: US 12,081,538 B2
(45) Date of Patent: Sep. 3, 2024

(54) METHOD, SYSTEM AND APPARATUS FOR PROTECTING ACCESS TOKENS CREATED BY MULTIFACTOR AUTHENTICATION

(71) Applicant: Intel Corporation, Santa Clara, CA (US)

(72) Inventors: Omer Ben-Shalom, Rishon Le-Tzion (IL); Oren Galler, Raanana (IL); Alex Nayshtut, Gan Yaven (IL)

(73) Assignee: Intel Corporation, Santa Clara, CA (US)

( * ) Notice: Subject to any disclaimer, the term of this patent is extended or adjusted under 35 U.S.C. 154(b) by 260 days.

(21) Appl. No.: 17/855,648

(22) Filed: Jun. 30, 2022

(65) Prior Publication Data
US 2024/0007456 A1    Jan. 4, 2024

(51) Int. Cl.
*H04L 9/40* (2022.01)

(52) U.S. Cl.
CPC ........ *H04L 63/083* (2013.01); *H04L 63/0428* (2013.01); *H04L 63/18* (2013.01); *H04L 2463/082* (2013.01)

(58) Field of Classification Search
CPC ............... H04L 2463/082; H04L 63/18; H04L 63/0853; H04L 63/083; H04L 63/0428; H04L 63/0815; H04L 63/0876; H04L 67/55; H04L 9/3226; G06F 21/41; G06F 21/64; H04M 3/5175; H04W 12/06
See application file for complete search history.

(56) References Cited

U.S. PATENT DOCUMENTS

| | | | |
|---|---|---|---|
| 2018/0124039 A1* | 5/2018 | Grajek | G06F 21/64 |
| 2019/0222560 A1* | 7/2019 | Ford | H04W 12/06 |
| 2019/0334884 A1* | 10/2019 | Ross | G06F 21/41 |
| 2020/0099677 A1* | 3/2020 | Grajek | H04L 63/0815 |
| 2020/0358755 A1* | 11/2020 | Abdul | H04L 67/55 |
| 2020/0404019 A1* | 12/2020 | Drake | H04L 9/3226 |
| 2021/0385248 A1* | 12/2021 | Ilincic | H04M 3/5175 |
| 2022/0210156 A1* | 6/2022 | Shah | H04L 63/0815 |
| 2022/0385656 A1* | 12/2022 | Gujarathi | H04L 63/0876 |

* cited by examiner

*Primary Examiner* — Le H Luu

(57) ABSTRACT

The disclosure generally relates to method, system and apparatus for multifactor authentication exchange using out of band communication to authenticate a user while defending against the man in the middle attack. In an exemplary method, the disclosed principles provide a multifactor authentication (MFA) exchange, which includes: receiving an authentication request through in-band communication from a first device associated with a user to authenticate the user, the authentication request including a first authentication factor to identify the user; generating a second authentication factor, the second authentication factor further comprising an authorization token; generating an encryption key to encrypt the authorization token and a redirect Uniform Resource Locator (URL) address; and communicating the second authentication factor, the encryption key and the redirect URL address to a second device associated with the user.

24 Claims, 6 Drawing Sheets

METHOD, SYSTEM AND APPARATUS FOR PROTECTING ACCESS TOKENS CREATED BY MULTIFACTOR AUTHENTICATION

FIELD

The disclosure generally relates to method, system and apparatus for multifactor authentication exchange using out of band communication to authenticate a user while defending against the man in the middle attack. More specifically, an embodiment of the disclosure is directed to using additional measures including token encryption to safeguard against the so-called man in the middle attacks.

BACKGROUND

Conventional multi-factor authentication ("MFA") methods and systems are considered as the primary protection against impersonation and identity theft. This technology, is however, susceptible to the so-called man in the middle attacks ("MTM"). The man in the middle attacks do not interrupt the authentication flow (first and second factors) but intercept the resulting authorization tokens sent from the backend to the device. This type of attack has been proven effective with banking trojans or other adversary campaigns and is one of the leading attack vectors against individuals, companies and government entities. The man in the middle attacks have been on the rise and have effectively rendered the MFA technology ineffective.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
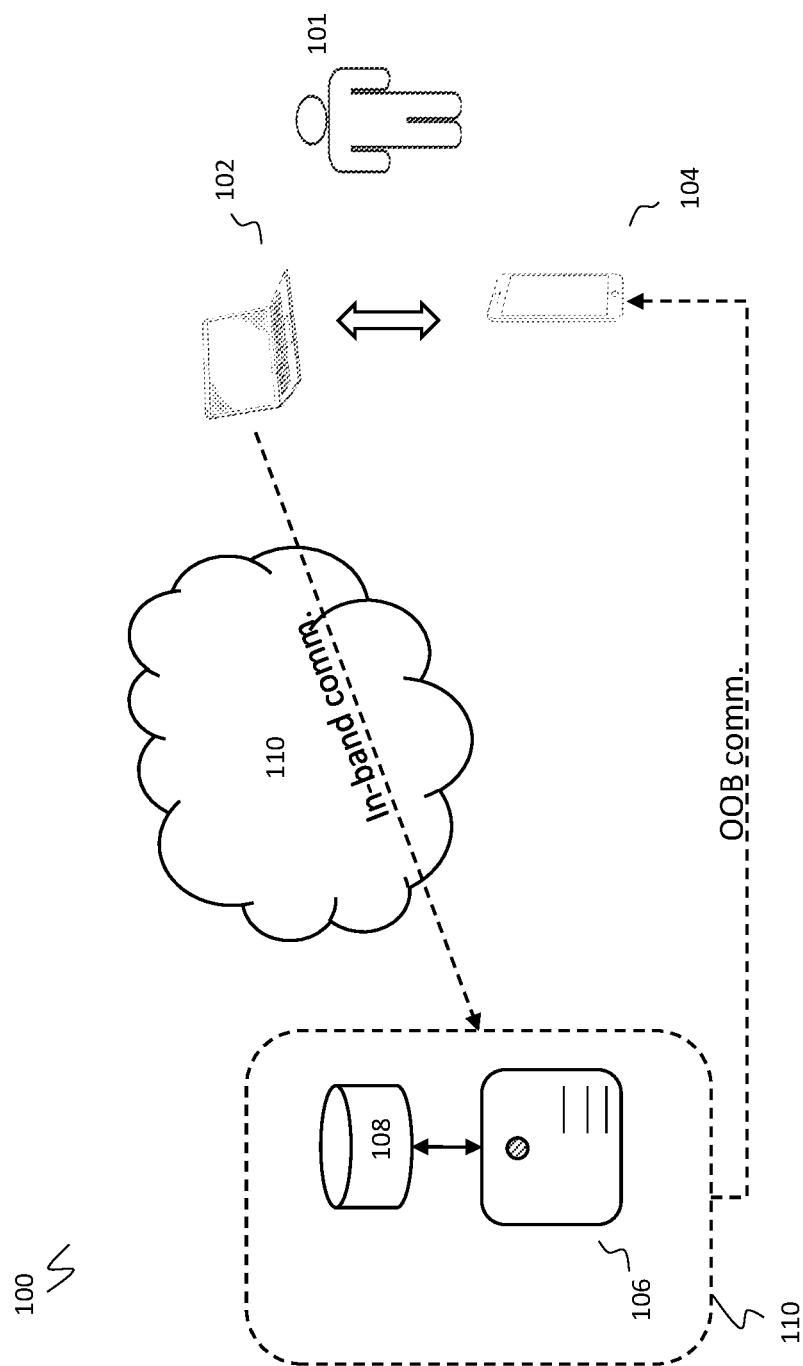
FIG. 1 is a schematic representation of an exemplary embodiment for implementing the disclosed principles.

In the following description, numerous specific details are set forth in order to provide a thorough understanding of various embodiments. However, various embodiments may be practiced without the specific details. In other instances, well known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

References to "one embodiment," "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Various labels may be used in describing particular devices, software, functions, etc. These are used for simplicity and convenience, but this should not be interpreted to mean that only items with those labels are covered by the description. Devices, software, functions, etc., that perform in the same manner as the described items, but are labeled with different terminology, should be considered to be equivalent to the described items.

Various embodiments of the invention may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media, optical storage media; a flash memory, etc.

The term "wireless" may be used to describe circuits, devices, systems, methods, techniques, communications channels, etc., that communicate data by using modulated electromagnetic radiation through a non-solid medium. A wireless device may comprise at least one antenna, at least one radio, at least one memory, and at least one processor, where the radio(s) transmits signals through the antenna that represent data and receives signals through the antenna that represent data, while the processor(s) may process the data to be transmitted and the data that has been received. The processor(s) may also process other data which is neither transmitted nor received.

As used within this document, the term "mobile device" is intended to cover those devices whose wireless communications are at least partially scheduled and controlled by the network controller. A mobile device (MD) may also be known as a mobile station (MS), STA, subscriber station (SS), user equipment (UE), or any other term that may arise to describe the functionality of a mobile device. Mobile devices may move during such communications, but movement is not required.

As used within this document, the term "communicate" is intended to include transmitting and/or receiving. This may be particularly useful in claims when describing the organization of data that is being transmitted by one device and received by another, but only the functionality of one of those devices is required to infringe the claim. Similarly, the exchange of data between a network controller and a mobile device (both devices transmit and receive during the exchange) may be described as 'communicating', when only the functionality of one of those devices is being claimed.

As briefly discussed, conventional MFA methods and systems are considered as the primary protection technology against impersonation and identity theft. This technology is susceptible to the so-called man in the middle (MTM) attacks. The MTM attacks do not interrupt the authentication flow (first and second factors) but rather intercept the resulting authorization tokens sent from the backend to the device. This type of attack has been proven effective with banking trojans or other adversary campaigns and is one of the leading attack vectors against individuals, companies and government entities. The MT attacks have been on the rise and have rendered the MFA technology ineffective.

In cryptography and computer security, a man in the middle attack is a cyberattack where the attacker secretly relays and possibly alters the communications between two parties who believe that they are directly communicating with each other, as the attacker has inserted themselves between the two parties. One example of a MTM attack is active eavesdropping, in which the attacker makes independent connections with the victims and relays messages between them to make them believe they are talking directly to each other over a private connection, when in fact the entire conversation is controlled by the attacker. The attacker must be able to intercept all relevant messages passing between the two victims and inject new ones. This is straightforward in many circumstances; for example, an attacker within the reception range of an unencrypted Wi-Fi access point could insert itself as the MTM. As it aims to circumvent mutual authentication, an MTM attack can succeed only when the attacker impersonates each endpoint sufficiently well to satisfy their expectations. Most conventional cryptographic protocols include some form of endpoint authentication specifically to prevent MTM attacks.

Conventional solutions to the MTM problem typically focus on preventing the MTM interception of traffic and/or malicious sites which pretend to be the login/authorization backend. Other solutions include detecting masquerading infrastructure (e.g., Evil twins—AP or cellular tower masquerading) and attempting to detect sites pretending to be login sites through machine learning matching of sites against known authentication/authorization backend sites such as Fast Identity Online Authorization (FIDO) specification.

Other conventional solutions include the so-called token binding which is a proposed standard for a Transport Layer Security (TLS) extension that aims to increase TLS security by using cryptographic certificates on both ends of the TLS connection. Current practice often depends on bearer tokens, which may be lost or stolen. Bearer tokens are also vulnerable to MTM attacks or replay attacks. In contrast, bound tokens are established by a user agent that generates a private-public key pair per target server, providing the public key to the server, and thereafter proving possession of the corresponding private key on every TLS connection to the server. Such models are not widely used.

Among other reasons, the conventional solutions have proved ineffective because they are configured to protect against the type of attacks that rely on traffic interception or phishing. Specifically, detection of malicious infrastructure/Evil twin is not perfect and does not detect interception beyond the first hop (i.e., it connects to a legitimate AP/cell but traffic is intercepted farther on either on the local network (e.g., Domain Name Server poisoning) or farther upstream.) Machine learning (ML) matching is good against phishing/waterhole attacks only. Further, ML matching can be defeated with adversary learning by an attacker training its site to look similar enough to a human but not be detected by the ML model. The token binding MTM protection helps solve an MTM attack against the MFA factor but does nothing to protect the resulting access tokens. Attackers allow the user to conclude the MFA then gain possession of the token. The tokens are then used to allow the attacker to act as the user until the token's life expires. Finally, token binding protection binds tokens to a client Public Key Infrastructure (PKI) keys to make sure they are not used from other clients but the ecosystem to generate, manage and use these keys is complex and consequently not widely used.

To address these and other deficiencies, an embodiment of the disclosure relates to method, system and apparatus to prevent MFA attacks by protecting tokens and redirecting URL against alteration/theft during transit. In certain exemplary embodiments, in-band and out of band communication modes are use to circumvent the attackers' reach as the attackers do not have access to out-of-band communication (OOB) or to the communication between the user's multiple devices.

The disclosed embodiments are concerned with prevention of the MTM attack by preventing access to the token and/or the session cookie which is encrypted and used between the backend and the browser by allowing an out-of-band communication to be used between the device and backend system. In one implementation, two or more additional elements are added to the secondary authentication factors (e.g., push notification) that are used in the conventional systems: an encryption key for the token that is passed back and a hash key to validate the token. These elements may be sent along with the conventional secondary authentication information through OOB communication to the user's secondary device.

The OOB communication may be used, for example, to exchange encryption/decryption keys or hash function required for the authentication. An MTM cannot make use of the authentication token without the OOB keys passed through the OOB channel (e.g., cellular) communication.

In an exemplary application, the solution encrypts the authorization cookie/token, and provides a signature for both cookie/token and redirects the URL (or provides a redirected URL). Key and hash function information are passed as additional information elements in the existing multi-factor at an OOB authentication flow. Stated differently, an embodiment of the disclosure requires adding two or more additional elements to the conventional secondary authentication factors. The additional elements may includer one or more of (i) an encryption key for the token, and (ii) a hash to validate the token, and optionally, the redirect URL address. The redirect URL address may or may not be encrypted. The additional elements are separate and apart from the conventional push notification or other conventional secondary authentication factors that is passed to the user's secondary device for authentication. The so-called additional elements are sent in addition to the conventional push notification or conventional secondary authentication factors.

These elements may also be sent through OOB communication to the user's second device. They may be sent to the user's second device along with, or apart from, the conventional second factor authentication information (i.e., push notification, secondary authentication code, etc.). The user's secondary device may pass the new elements to the user's primary device with (or apart from) the conventional second factor authentication information. The user's secondary device may pass the new elements to the user's primary device through, for example, Near Field Communication (NFC), Bluetooth (BT) or Bluetooth Low Energy (BLE). In one embodiment, the additional elements comprise the encryption key for the token and the redirect URL address. In another embodiment, the token and the URL redirect address are encrypted and are sent to the user's second device along with the hash function for the token and the redirect URL address.

An advantage of the disclosed embodiment is the added security which is accomplished by defeating a critical attack vector: session\access token hijacking. Another advantage is that the disclosed embodiments require little to no prior setup on the client side and are of relatively low computational intensity.

FIG. 1 is a schematic representation of an exemplary embodiment for implementing the disclosed principles. In FIG. 1, system 100 includes user primary device 102, user secondary device 104, communication cloud 110. Here, user 101 may desire to access a service (not shown) which requires MFA. Such services comprise, for example, financial, academic, governmental, educational or institutional services.

Authentication and authorization backend 110 may comprise authentication server 106 and authentication database 108. Authentication server 106 may comprise authentication server circuitry, secure token server circuitry and other circuitry and components required to support MFA login infrastructure. An exemplary infrastructure is configured to send an OOB message to a secondary device (e.g., device 104) using a conventional push notification (e.g., Apple® or Google® push-notification backend). In some embodiments, authentication server 106 may comprise one or more circuitry configured to communicate with database 108 to, among others, retrieve authentication information required for executing MFA for user 101. Database 108 may comprise one or more circuitry to store information required for such authentication.

User 101 may be associated with devices 102 and 104, such that user 101 may use devices 102 and 104 exclusively or at least have privacy access rights to one or more of such devices. Device 102 may comprise, for example, a laptop, a desktop computer or any other computationally-capable device capable of internet communication. Internet communication may be wired or wireless communication. Device 104 is shown as a smartphone but may comprise any computationally-capable device capable of internet communication. In one application, user 101 engages one of devices 102, 104 to engage in MFA with authentication server 106. One of devices two may be primarily engaged as the main device (e.g., device 102) to perform authentication and may consume cloud resources 110 for this purpose. The other device may be secondarily engaged (e.g., smartphone 104) and may be used to receive MFA information via OOB communication. Devices 102 and 104 may communicate directly with each other, for example, through wireless or any near field communication technique. This information may comprise secondary factors push notification.

For example, user 101 may engage laptop 102 to access a bank account, for which, MFA is initiated. Authentication may proceed through cloud 110 or it may be an on-premises service where cloud 110 would define a local area network. This communication may be considered in-band communication. During the authentication process, authentication information (authentication factors) may be pushed to the smart phone 104 (i.e., secondary device) which may then be communicated to the laptop 102 (i.e., primary device) through OOB communication. The OOB communication may comprise Bluetooth (BT), Bluetooth Low Energy (BTE) or Near-Field Communication (NFC).

Figure 2:
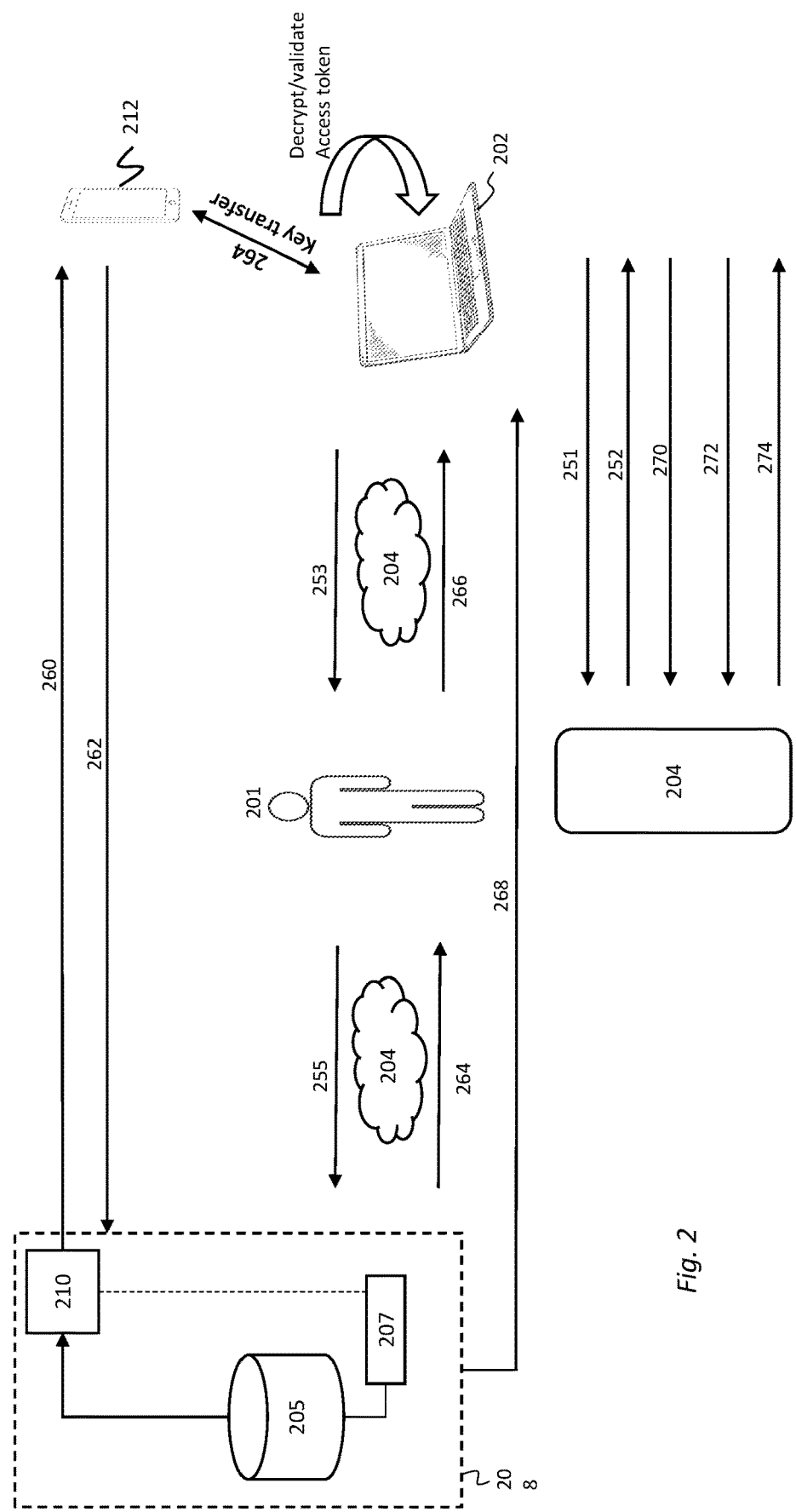
FIG. 2 schematically illustrates an exemplary system for implementing an embodiment of the disclosure.

FIG. 2 schematically illustrates an exemplary system and method for implementing an embodiment of the disclosure. In the exemplary embodiment of FIG. 2, a user desires to use an MFA to access a desired account. The hacker threat is illustrated by MTM 201 positioned to intercept access token as in the conventional system. The hacker may be lurking on cloud 204. The disclosed embodiments eliminates the MTM threat as further discussed below.

The process begins when user (not shown), accesses device 202 (e.g., laptop computer) to transmit a request resource (illustrated by arrow 251) from the cloud. The request is routed through a cloud (or cloud server) 204 for multifactor authentication. Cloud 204 redirects the user through device 202 to backend authentication service (interchangeably, authentication controller) 208 as illustrated by arrow 253. Backend authentication service 208 may comprise, for example, Microsoft® login. Device 202 then sends a request to obtain an authentication token through cloud 204 to backend services 208. This is illustrated by arrows 253, 255.

As illustrated, MTM 201 intercepts the user's request (see arrows 253, 255) and from this point forward the interactions between the user and authentication/authorization backend 208 that go through that channel are intercepted and may be altered in both directions. Next, a login page is generated and presented to the user at device 202. The login page may be generated by MTM 201 and controlled by that entity. The login page is then displayed on device 202. The user interacts with the login webpage (potentially produced by MTM 201) and concludes the first factor authentication. The first factor authentication may comprise user-provided information such as username and password (i.e., first authentication factor). The first authentication factor will likely be visible to MTM 201 and may be compromised.

In one embodiment, backend 208 (interchangeably, login backend or STS backend) comprises, among others, database 205 and server 207. Each of database 205 and server 207 may comprise one or more processors and/or memory circuitry configured to provide authentication services and secure token services (STS). The processors and memory circuitry may comprise hardware, software or a combination of hardware and software (i.e., firmware). Database circuit 205 may comprise hardware necessary to store users' authentication information. Server circuitry 207 may comprise one or more controller or control engines to implemented various authentication steps. Server circuitry 207 may store instructions which causes circuitry 207 to identify a user by receiving the user's primary information (e.g., primary authentication factors), retrieving the user's authentication information from database 205, soliciting additional authentication information (e.g., secondary authentication information) from the user, and directing the MFA through OOB communication or push notification.

In certain embodiments, backend authentication controller 208 may comprise processors and one or more processing logic configured to implement the required tasks using hardware, software or firmware. In one embodiment, backend 208 may reside on one or more servers. In still another embodiment, backend authentication controller 208 may comprise one or more circuitries with software logic configured to implement the disclosed principles.

In an exemplary implementation, the backend authentication controller 208 receives and validates the first authentication factor; in this embodiment, backend 208 may act as the initial login page. Thereafter, backend 208 may initiate a second factor authentication through exchange with user 202 with the user using a push-notification (or other OOB capable) service which is not in the interception path (253, 255). In one embodiment of the disclosure, an additional step is provided whereby backend authentication controller 208 also creates an encryption key for the authentication key and a hash function to validate the token (and optionally redirected URL address) even though the second factor has not been concluded yet.

Push notification service (interchangeably, push notification engine) 210 may be a part of the backend authentication controller 208. Push notification engine 210 may comprise one or more processors and memory circuitry configured with logic to implement at least the steps discussed for OOB communication and/or MFA. In certain embodiments, push notification engine 208 may be integrated with authentication controller 208. In one implementation, push notification engine 210 may transmit an OOB message 260 to second device 212. The OOB message 260 may comprise an OOB MFA request including one-time pad (OTP), Key and Hash (or any combination thereof).

As noted above, an embodiment of the disclosure requires adding two or more elements to the conventional secondary authentication factors which are passed to the user's secondary device through OOB communication. The additional elements may includer one or more of (i) an encryption key for the token, and (ii) a hash to validate the token, and optionally, the redirect URL address. The redirect URL address may or may not be encrypted. The additional elements are separate and apart from the conventional push notification or other conventional secondary authentication factors that is communicated to the user's secondary device for authentication. The so-called additional elements are sent in addition to the conventional push notification or conventional secondary authentication factors. The new elements are also sent through OOB communication with the user's second device. The additional elements may be sent to the user's second device along with, or apart from, the conventional second factor authentication information (i.e., push notification, secondary authentication code, etc.) Further, the user's secondary device may relay the new elements to the user's primary device with (or apart from) the conventional second factor authentication information.

In an exemplary embodiment, push notification engine 210 generates an encryption key and a hash for both the token (which may still have to be created) and the redirect URL address, even though the second factor has not yet been concluded. The redirect URL address may optionally be encrypted. This information may be then transmitted GOB to second user device 212. In another embodiment, the push notification engine encodes the authentication token and the redirect URL address by using the encryption key and the hash function to form an encoded second authentication factor.

The user, unaware of MTM 201, concludes the second factor authentication and transmits the second factor response to backend 208 as illustrated by arrow 262. The MFA result is sent back to the backend server 208 OOB. Secondary device 212 keeps the key and hash at a local memory (not shown) and then relays this information to primary device 202 as schematically illustrated by arrow 264. The communication between secondary device 212 and primary device 202 may be a two-way communication. Further, this communication may comprise BT, BLE, NFC or any other type of communication between devices 212 and 202.

Next, backend STS 208 sends the access token/cookie and the redirect URL address as in the conventional applications to primary device 202. This is schematically illustrated by arrow 264.

MTM 201 cannot use the generated token since it is encrypted. MTM 201 may then alter the URL to try to resend the user to itself as if MTM was the real service. This is illustrated by arrows 264, 266. However, absent a second factor authentication such attempts would be futile.

Access token eventually reaches user's primary device 201 as schematically illustrates by arrow 268. The primary device 202, using the key and hash received from secondary device 212 (see transfer 264), decrypts the token and validates both decrypted token and redirect URL using the hash (see, e.g., steps 260, 264).

Next, primary device 201 creates a TLS tunnel to the provided and verified redirect URL. This tunnel is protected by the true service TLS certificate as normal and is schematically illustrated by arrow 270. Next, primary device 202 requests services from service provider 204 in the normal operating mode as schematically illustrated by arrow 272. At step 274, service provider 204 responds to the request in its normal operating mode.

Figure 3:
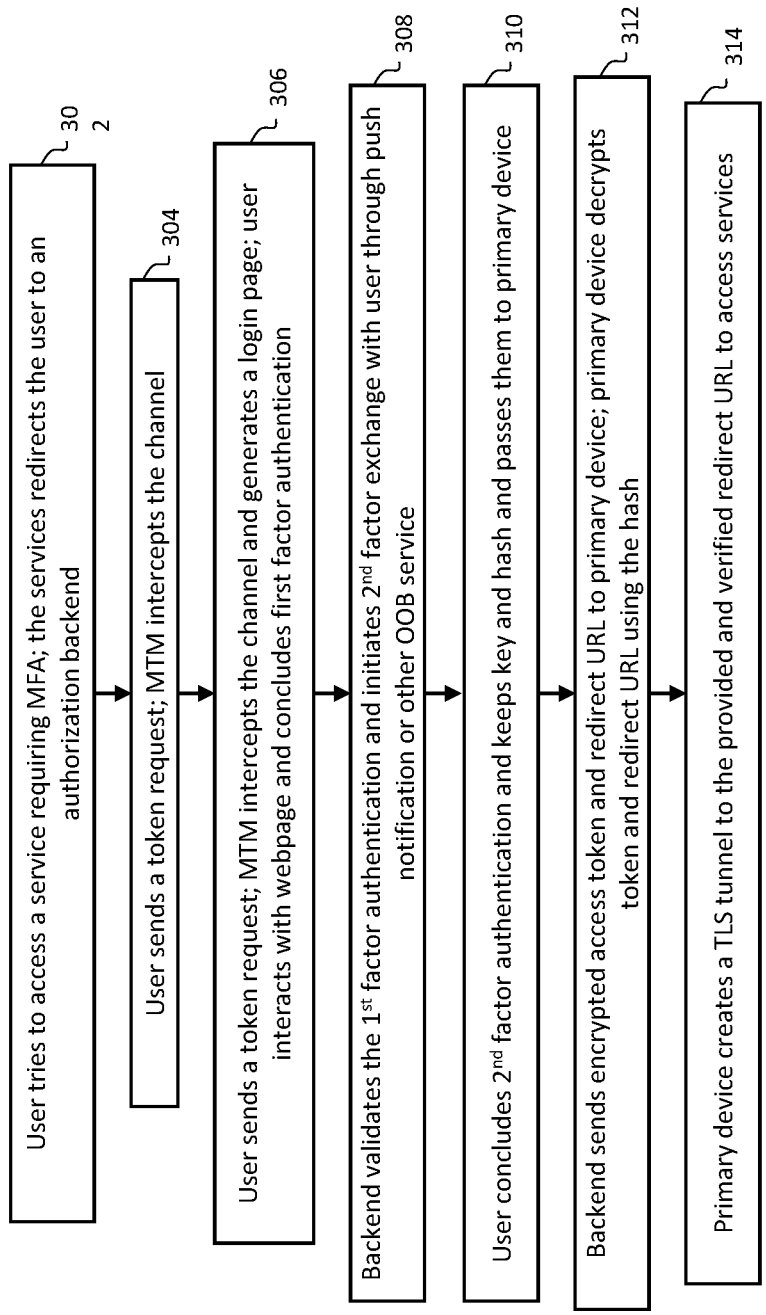
FIG. 3 is an exemplary flow diagram for implementing a process according to one embodiment of the disclosure.

FIG. 3 illustrates an exemplary flow diagram for implementing an embodiment of the disclosure. The flow diagram of FIG. 3 may be implemented in logic to direct one or more part of a communication device for the desired MFA authentication. The process of FIG. 3 starts at step 302 where the user tries to access a service which requires MFA. Such services may comprise, for examples, services of a financial institution which may require multifactor authentication. At step 302, the service company redirects the user to an authorized backend service to obtain MFA. The backend service company may provide authentication service and secure token service (STS). An exemplary backend infrastructure may include Microsoft® login or Duo Security®.

At step 304, the user sends a request to obtain a token. The request may be sent through the cloud and in the conventional manner. The request may be intercepted by the MTM; although it should be noted that such interception or indeed no interception is required for the implementation of the disclosed principles. If the communication channel is intercepted by the MTM, it can be assumed that all further interception on the channel are intercepted and likely altered by the MTM. The alteration may be in both directions, i.e., altered communication by the MTM to both the user and the STS. The STS may generate a login page and presents the login page to the user for the first factor authentication. It should be noted that the MTM may intercept the communication and generate, alter or otherwise control the login page which is presented to the user.

The user, having been presented with the login page as the first factor authentication, then enter the required information (e.g., username and password). In the event of the MTM interception, this data is subject to theft and hacking. This $1^{st}$ factor authentication information is then communicated to the backend STS for validation.

Once validated, the backend STS initiates in the $2^{nd}$ factor authentication with the user. In one embodiment of the disclosure, a push notification or other OOB capable service is used for the $2^{nd}$ factor authentication. In addition to the conventional second factor authentication, and encryption key for the token and a hash function to validate the token are also sent to the user as additional elements in the OOB communication. The push notification along with the additional elements communication conducted between the STS and the user's secondary device such that the communication is not on the intercepted channel. In one implementation, the OOB communication includes an encryption key for the authorization token as well as a hash to validate the token. This information maybe created even though the $2^{nd}$ factor authentication has not yet been concluded. In this manner, the user has the key to decrypting access token and the URL for the requested service. This may occur even before the backend STS sends the encrypted access token and/or the URL to the user's primary device. The secondary device engaged in the OOB communication communicates this information to the user's primary device. At the conclusion of step 310, the STS and the user's secondary device conclude the $2^{nd}$ factor authentication.

At step 312, the backend STS sends access token/cookie and redirect URL address (as well as the additional information elements) to the user's primary device. As stated, in one embodiment of the disclosure, this information is encrypted such that it remains inaccessible to the MTM. That is, the MTM cannot use the generated token because it is encrypted. The MTM may try to alter the redirect URL address in order to send the user back to itself. Because the URL is encrypted, the MTM's efforts will not result in a tangible access.

At step 314, the primary device uses the key and hash received from the secondary device (step 310) decrypts the token and validates both decrypted token and redirect URL address using the hash. A TLS tunnel can then be established between the user's primary device and the desired service. This tunnels can be protected by the authentic service TLS certificate.

Figure 4:
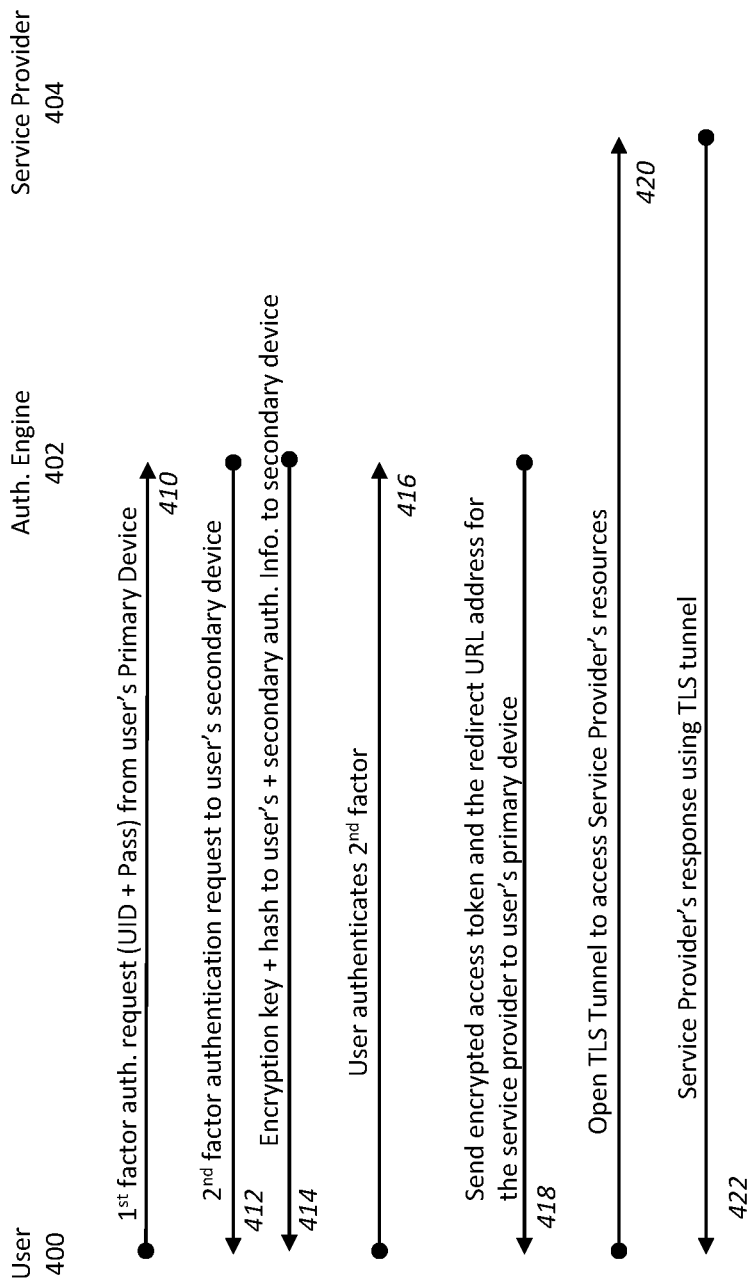
FIG. 4 schematically illustrates an exemplary sequencing implementation of a disclosed embodiment.

FIG. 4 schematically illustrates an exemplary sequencing implementation of a disclosed embodiment. Specifically, the embodiment of FIG. 4 represents users 400, authentication engine 402 and service provider 404. User 404 may be equipped with a primary and a secondary devices. Authentication engine 402 may be configured for MFA. Authentication engine 402 may comprise circuitry for verifying MFA and for storing user information for such authentication. In an exemplary embodiment, authentication engine 402 may comprise an authentication controller in communication with a memory circuitry. The authentication controller may comprise additional circuitry for OOB communication (e.g., push notification engine) as well as logic to generate an encryption key and hash. Authentication controller 402 may further comprise communication capability (e.g., wired or wireless communication means) for OOB communication with the users' devices.

At step 410, user transmits a first factor authentication from its primary device to authentication engine 402. The request may optionally include certain primary authentication factors, for example, the user's identification (UID) and the password. Authentication engine 402 then identifies the users and a secondary device associated with the user. This information may be provided by the user apriori. Authentication engine 402 then sends (step 412) secondary authentication information (e.g., push notification request) along with encryption key for the token that is passed back and a hash function to validate the token) to the user's secondary device. In one embodiment, this information is sent through an OOB channel. In another embodiment, this information is sent as push notification.

At step 414, authentication engine 402 sends the user's secondary device encryption key and hash to be used with the access token (which may be generated subsequently). User's secondary device may store this information locally or may transmit this information to the user's primary device to be used at the subsequent steps 418, 420. Any form of out of band communication may be used between the user's primary and secondary device to communicate the encryption and hash information. At step 416, the use's secondary device sends the secondary factor authentication to authentication engine 402.

It should be noted that in one embodiment, step 414 may precede step 416 and in another embodiment, step 416 may precede step 414. That is, in certain implementations, authentication engine 402 may await receipt of the secondary authentication factors from the user's secondary device before sending the encryption key and hash function information.

At step 418, authentication engine 402 sends encrypted access token and the redirect URL address for the service provider to user's primary device. The user's primary device having received the encryption and hash information previously from the user's secondary device, decrypts the received information and, at step 420, opens a TLS tunnel to access service provider 404. At step 422, service provider responds to user 400 through the secure tunnel.

In one embodiment of the disclosure, all or some of the implementations discussed in relation to disclosed embodiments may be implemented at a System-On-Chip (SOC). For example, the authentication engine (or backend authentication service and secure token service) may be formed on an integrated circuit. The integrated circuit may be an SOC. In certain embodiments, the push notification engine (210, FIG. 2) may define an SOC.

Figure 5:
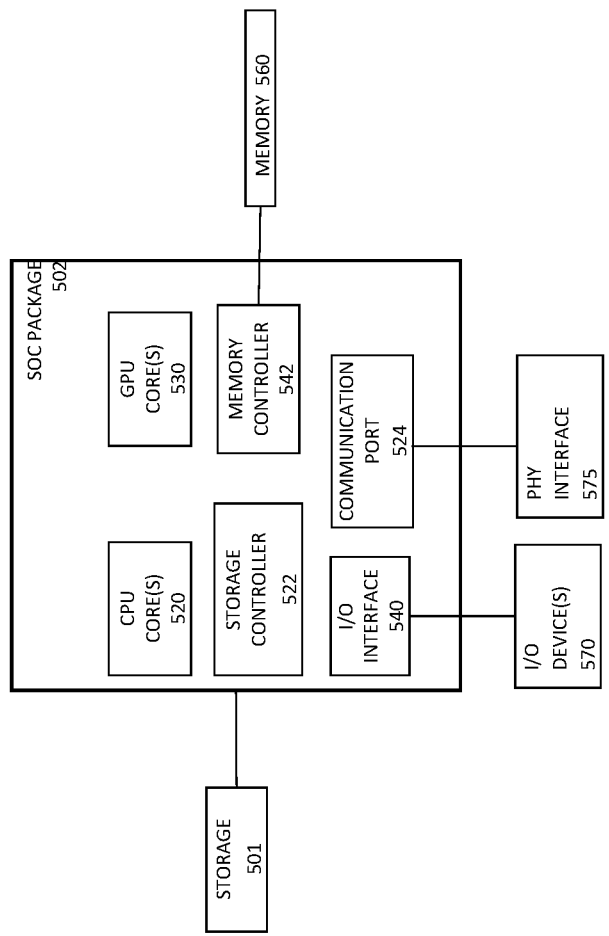
FIG. 5 illustrates a block diagram of a System-On-Chip (SoC) package in accordance with an embodiment.

FIG. 5 illustrates a block diagram of an SOC package for executing the security pipeline in accordance with an embodiment. In one embodiment, the SOC illustrated in FIG. 5 may define a push notification engine according to the disclosed principles. In another embodiment, the SOC of FIG. 5 may define a backend authentication controller.

As illustrated in FIG. 5, SOC 502 includes one or more Central Processing Unit (CPU) cores 520, one or more Graphics Processor Unit (GPU) cores 530, an Input/Output (I/O) interface 540, and a memory controller 542. SOC Package 502 communicates with storage circuitry 501. Storage circuitry 501 may comprise conventional memory for storing instructions. In an exemplary embodiment, storage 501 communicates with storage controller 522 which implement the stored instructions at SOC 502. Various components of the SOC package 502 may be coupled to an interconnect or bus such as discussed herein with reference to the other figures. Also, the SOC package 502 may include more or less components, such as those discussed herein with reference to the other figures. Further, each component of the SOC package 520 may include one or more other components, e.g., as discussed with reference to the other figures herein. In one embodiment, SOC package 502 (and its components) is provided on one or more Integrated Circuit (IC) die, e.g., which are packaged into a single semiconductor device.

As illustrated in FIG. 5, SOC package 502 is coupled to a memory 560 via the memory controller 542. In an embodiment, the memory 560 (or a portion of it) can be integrated on the SOC package 502.

The I/O interface 540 may be coupled to one or more I/O devices 570, e.g., via an interconnect and/or bus such as discussed herein with reference to other figures. I/O device(s) 570 may include one or more of a keyboard, a mouse, a touchpad, a display, an image/video capture device (such as a camera or camcorder/video recorder), a touch screen, a speaker, or the like. Communication port 524 communicates with PHY interface 575 which may define an ethernet port.

Figure 6:
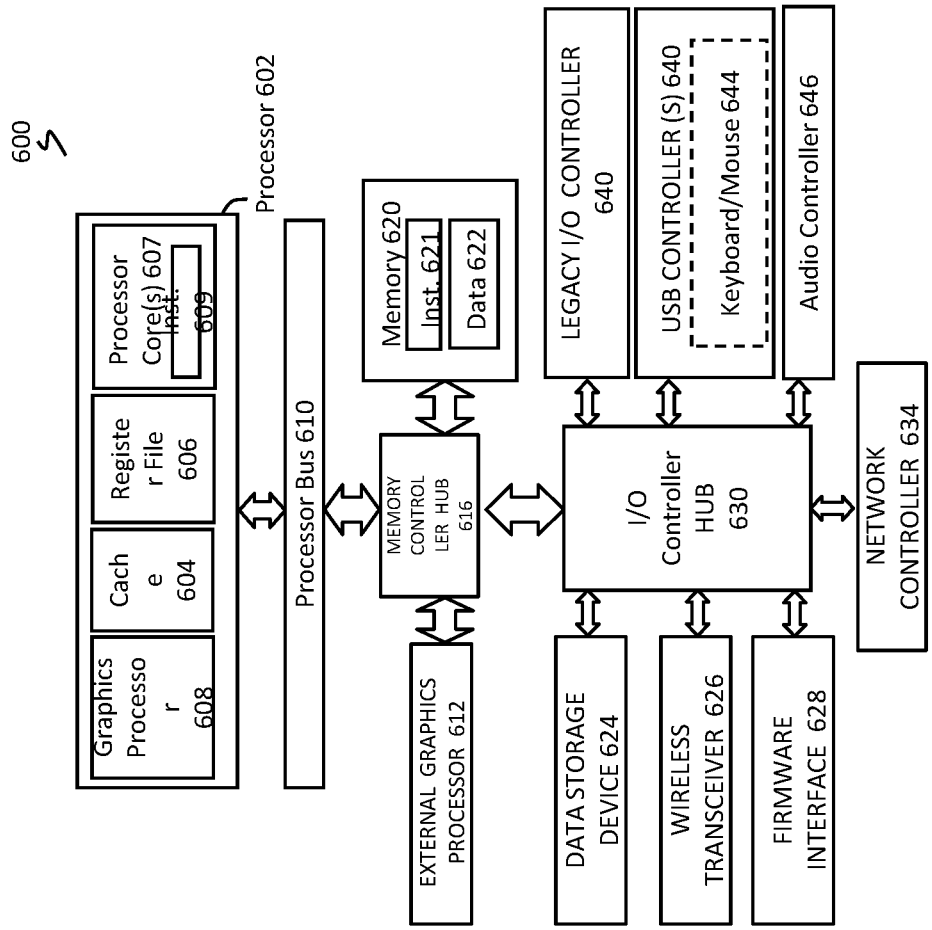
FIG. 6 is a block diagram of a processing system according to an embodiment of the disclosure.

FIG. 6 is a block diagram of a processing system 600, according to an embodiment. In various embodiments the system 600 includes one or more processors 602 and one or more graphics processors 608, and may be a single processor desktop system, a multiprocessor workstation system, or a server system having a large number of processors 602 or processor cores 607. In on embodiment, the system 600 is a processing platform incorporated within a system-on-a-chip (SoC or SOC) integrated circuit for use in mobile, handheld, or embedded devices.

An embodiment of system 600 can include or be incorporated within a server-based gaming platform, a game console, including a game and media console, a mobile gaming console, a handheld game console, or an online game console. In some embodiments system 600 is a mobile phone, smart phone, tablet computing device or mobile Internet device. Data processing system 600 can also include couple with, or be integrated within a wearable device, such as a smart watch wearable device, smart eyewear device, augmented reality device, or virtual reality device. In some embodiments, data processing system 600 is a television or set top box device having one or more processors 602 and a graphical interface generated by one or more graphics processors 608. In another embodiment, the disclosed embodiments define a server in a data center.

In some embodiments, the one or more processors 602 each include one or more processor cores 607 to process instructions which, when executed, perform operations for system and user software. In some embodiments, each of the one or more processor cores 607 is configured to process a specific instruction set 609. In some embodiments, instruction set 609 may facilitate Complex Instruction Set Computing (CISC), Reduced Instruction Set Computing (RISC), or computing via a Very Long Instruction Word (VLIW). Multiple processor cores 607 may each process a different instruction set 609, which may include instructions to facilitate the emulation of other instruction sets. Processor core 607 may also include other processing devices, such a Digital Signal Processor (DSP).

In some embodiments, the processor 602 includes cache memory 604. Depending on the architecture, the processor 602 can have a single internal cache or multiple levels of internal cache. In some embodiments, the cache memory is shared among various components of the processor 602. In some embodiments, the processor 602 also uses an external cache (e.g., a Level-3 (L3) cache or Last Level Cache (LLC)) (not shown), which may be shared among processor cores 607 using known cache coherency techniques. A register file 606 is additionally included in processor 602 which may include different types of registers for storing different types of data (e.g., integer registers, floating point registers, status registers, and an instruction pointer register). Some registers may be general-purpose registers, while other registers may be specific to the design of the processor 602.

In some embodiments, processor 602 is coupled to a processor bus 610 to transmit communication signals such as address, data, or control signals between processor 602 and other components in system 600. In one embodiment the system 600 uses an exemplary 'hub' system architecture, including a memory controller hub 616 and an Input Output (I/O) controller hub 630. A memory controller hub 616 facilitates communication between a memory device and other components of system 600, while an I/O Controller Hub (ICH) 630 provides connections to I/O devices via a local I/O bus. In one embodiment, the logic of the memory controller hub 616 is integrated within the processor.

Memory device 620 can be a dynamic random-access memory (DRAM) device, a static random-access memory (SRAM) device, flash memory device, phase-change memory device, or some other memory device having suitable performance to serve as process memory. In one embodiment the memory device 620 can operate as system memory for the system 600, to store data 622 and instructions 621 for use when the one or more processors 602 executes an application or process. Memory controller hub 616 also couples with an optional external graphics processor 612, which may communicate with the one or more graphics processors 608 in processors 602 to perform graphics and media operations.

In some embodiments, ICH 630 enables peripherals to connect to memory device 620 and processor 602 via a high-speed I/O bus. The I/O peripherals include, but are not limited to, an audio controller 646, a firmware interface 628, a wireless transceiver 626 (e.g., Wi-Fi, Bluetooth), a data storage device 624 (e.g., hard disk drive, flash memory, etc.), and a legacy I/O controller 640 for coupling legacy (e.g., Personal System 2 (PS/2)) devices to the system. One or more Universal Serial Bus (USB) controllers 642 connect input devices, such as keyboard and mouse 644 combinations. A network controller 634 may also couple to ICH 630. In some embodiments, a high-performance network controller (not shown) couples to processor bus 610. It will be appreciated that the system 600 shown is exemplary and not limiting, as other types of data processing systems that are differently configured may also be used. For example, the I/O controller hub 630 may be integrated within the one or more processor 602, or the memory controller hub 616 and/O controller hub 630 may be integrated into a discreet external graphics processor, such as the external graphics processor 612.

The embodiments are provided to further illustrate different embodiments of the disclosed principles. These embodiments are exemplary and non-limiting. Other implementation of the disclosed principles may be implemented without being bound to these examples.

Example 1 is directed to a system comprising: an authentication controller to receive an authentication request from a first device associated with a user through in-band communication, the authentication request including a first authentication factor to identify the user; and a push notification engine in communication with the authentication controller, the push notification engine configured to receive instructions from the authentication controller to generate a second authentication factor, a second authentication factor further comprising an authorization token; and a communication circuitry to communicate the second authentication factor, an encryption key for the authorization token and a redirect URL address to a second device associated with the user.

Example 2 is directed to the system of Example 1, wherein the push notification engine is further configured to direct the second device encryption key and the second authentication factor to the first device.

Example 3 is directed to the system of Example 1, wherein the authentication request comprises a multifactor authentication request and wherein the first authentication factor comprises at least one of a name and a password associated with the user.

Example 4 is directed to the system of Example 1, wherein the communication circuitry communicates a hash function for the encryption key and the redirect URL address.

Example 5 is directed to the system of Example 1, wherein the communication circuitry communicates the second authentication factor to the second device through out of band (OOB) communication.

Example 6 is directed to the system of Example 1, wherein the communication circuitry communicates the encryption key to the second device through OOB communication.

Example 7 is directed to the system of Example 4, wherein the push notification engine encodes the authentication token and the redirect URL address by using the encryption key and the hash function to form the encoded second authentication factor.

Example 8 is directed to the system of Example 1, wherein the authentication controller communicates the encoded second authentication factor to the first device through in-band communication.

Example 9 is directed to a non-transitory computer-readable medium comprising a processor circuitry and a memory circuitry in communication with the processor circuitry and including instructions to provide multifactor authentication, the memory circuitry further comprising instructions to cause the processor to: receive an authentication request through in-band communication from a first device associated with a user to authenticate the user, the authentication request including a first authentication factor to identify the user; generate a second authentication factor, the second authentication factor further comprising an authorization token; generate an encryption key to encrypt the authorization token and a redirect Uniform Resource Locator (URL) address; communicate the second authentication factor, the encryption key and the redirect URL address to a second device associated with the user.

Example 10 is directed to the medium of Example 9, wherein the authentication request comprises a multifactor authentication request.

Example 11 is directed to the medium of Example 9, wherein the first authentication factor comprises at least one of a name and a password associated with the user.

Example 12 is directed to the medium of Example 9, wherein the instructions further cause the processor to generate a hash function and communicate the hash function to the second device.

Example 13 is directed to the medium of Example 9, wherein the instructions further cause the processor to communicate the second authentication factor to a second device associated with the user through out of band (OOB) communication.

Example 14 is directed to the medium of Example 12, wherein the instructions further cause the processor to direct the second device to communicate the encryption key and the hash function to the first communication device through OOB communication.

Example 15 is directed to the medium of Example 9, wherein the instructions further cause the processor to encrypt the token and send a hash function for the encrypted token to the second device.

Example 16 is directed to the medium of Example 9, wherein the instructions further cause the processor to encrypt the token and the redirect URL address and communicate the hash function to the second device.

Example 17 is directed to a method to provide multifactor authentication, the method comprising: receiving an authentication request through in-band communication from a first device associated with a user to authenticate the user, the authentication request including a first authentication factor to identify the user; generating a second authentication factor, the second authentication factor further comprising an authorization token; generating an encryption key to encrypt the authorization token and a redirect Uniform Resource Locator (URL) address; and communicating the second authentication factor, the encryption key and the redirect URL address to a second device associated with the user.

Example 18 is directed to the method of Example 17, wherein the authentication request further comprises a multifactor authentication request.

Example 19 is directed to the method of Example 17, wherein the first authentication factor further comprises at least one of a name and a password associated with the user.

Example 20 is directed to the method of Example 17, further comprising generating a hash function and communicating the hash function to the second device.

Example 21 is directed to the method of Example 17, further comprising communicating the second authentication factor to a second device associated with the user through out of band (OOB) communication.

Example 22 is directed to the method of Example 20, further comprising communicating the encryption key and the hash function to the first communication device through OOB communication.

Example 23 is directed to the method of Example 17, further comprising encrypting the token and sending a hash function for the encrypted token to the second device.

Example 24 is directed to the method of Example 17, further comprising encrypting the token and the redirect URL address and communicating the hash function to the second device.

While the principles of the disclosure have been illustrated in relation to the exemplary embodiments shown herein, the principles of the disclosure are not limited thereto and include any modification, variation or permutation thereof.

What is claimed is:

1. A system comprising:
  an authentication controller to receive an authentication request from a first device associated with a user through in-band communication, the authentication request including a first authentication factor to identify the user; and a push notification engine in communication with the authentication controller, the push notification engine configured to receive instructions from the authentication controller to generate a second authentication factor, a second authentication factor further comprising an authorization token; and a communication circuitry to communicate the second authentication factor, an encryption key for the authorization token and a redirect URL address to a second device associated with the user.

2. The system of claim 1, wherein the push notification engine is further configured to direct the second device encryption key and the second authentication factor to the first device.

3. The system of claim 1, wherein the authentication request comprises a multifactor authentication request and wherein the first authentication factor comprises at least one of a name and a password associated with the user.

4. The system of claim 1, wherein the communication circuitry communicates a hash function for the encryption key and the redirect URL address.

5. The system of claim 4, wherein the push notification engine encodes the authentication token and the redirect URL address by using the encryption key and the hash function to form the encoded second authentication factor.

6. The system of claim 1, wherein the communication circuitry communicates the encryption key to the second device through OOB communication.

7. The system of claim 1, wherein the communication circuitry communicates the second authentication factor to the second device through out of band (OOB) communication.

8. The system of claim 1, wherein the authentication controller communicates the encoded second authentication factor to the first device through in-band communication.

9. A non-transitory computer-readable medium comprising a processor circuitry and a memory circuitry in communication with the processor circuitry and including instructions to provide multifactor authentication, the memory circuitry further comprising instructions to cause the processor to:

receive an authentication request through in-band communication from a first device associated with a user to authenticate the user, the authentication request including a first authentication factor to identify the user;

generate a second authentication factor, the second authentication factor further comprising an authorization token;

generate an encryption key to encrypt the authorization token and a redirect Uniform Resource Locator (URL) address;

communicate the second authentication factor, the encryption key and the redirect URL address to a second device associated with the user.

10. The medium of claim 9, wherein the authentication request comprises a multifactor authentication request.

11. The medium of claim 9, wherein the first authentication factor comprises at least one of a name and a password associated with the user.

12. The medium of claim 9, wherein the instructions further cause the processor to generate a hash function and communicate the hash function to the second device.

13. The medium of claim 12, wherein the instructions further cause the processor to direct the second device to communicate the encryption key and the hash function to the first communication device through OOB communication.

14. The medium of claim 9, wherein the instructions further cause the processor to communicate the second authentication factor to a second device associated with the user through out of band (OOB) communication.

15. The medium of claim 9, wherein the instructions further cause the processor to encrypt the token and send a hash function for the encrypted token to the second device.

16. The medium of claim 9, wherein the instructions further cause the processor to encrypt the token and the redirect URL address and communicate the hash function to the second device.

17. A method to provide multifactor authentication, the method comprising:

receiving an authentication request through in-band communication from a first device associated with a user to authenticate the user, the authentication request including a first authentication factor to identify the user;

generating a second authentication factor, the second authentication factor further comprising an authorization token;

generating an encryption key to encrypt the authorization token and a redirect Uniform Resource Locator (URL) address; and communicating the second authentication factor, the encryption key and the redirect URL address to a second device associated with the user.

18. The method of claim 17, wherein the authentication request further comprises a multifactor authentication request.

19. The method of claim 17, wherein the first authentication factor further comprises at least one of a name and a password associated with the user.

20. The method of claim 17, further comprising generating a hash function and communicating the hash function to the second device.

21. The method of claim 20, further comprising communicating the encryption key and the hash function to the first communication device through OOB communication.

22. The method of claim 17, further comprising communicating the second authentication factor to a second device associated with the user through out of band (OOB) communication.

23. The method of claim 17, further comprising encrypting the token and sending a hash function for the encrypted token to the second device.

24. The method of claim 17, further comprising encrypting the token and the redirect URL address and communicating the hash function to the second device.

* * * * *